UNITED STATES PATENT OFFICE.

TRUE P. SLEEPER, OF AMBOY, ILLINOIS.

BLASTING-POWDER.

SPECIFICATION forming part of Letters Patent No. 241,163, dated May 10, 1881.

Application filed February 11, 1881. (Specimens.)

*To all whom it may concern:*

Be it known that I, TRUE P. SLEEPER, of the city of Amboy, in the county of Lee and State of Illinois, have invented a new and useful Combination of Chemicals for Use in Blasting; and I do hereby declare that the following is a full and exact description thereof, reference being had to the accompanying specimens of the ingredients used in preparing said combination, and of the composition itself.

This composition of my invention is a powerful explosive, of a power equal to or greater than that of giant-powder. It is as safe and convenient to handle as common gunpowder, and can only be exploded by contact with fire or sulphuric acid. It will not explode by concussion, is easily and cheaply manufactured, and peculiarly adapted to use in mines, because of the fact that after a blast in which it is used no noxious gases or vapors remain to prevent workmen from resuming labor, as in the case of blasts with all, or nearly all, the explosives now used in mining, and also because of its capability of being exploded by contact with sulphuric acid in places where fire cannot be used.

To enable others to make and use my invention, I will proceed to describe the process of its manufacture, and the manner of applying it to use.

The ingredients and proportions are: finely-pulverized chlorate of potassa, eight (8) parts; finely-pulverized white sugar, seven (7) parts; finely-pulverized charcoal, one part, with the right to vary the proportion or quantity of either ingredient one ounce in the pound when the quality of the ingredients is not uniform.

Process of manufacture: Sift the above ingredients, in the proportions named, separately through a fine sieve. Then mix thoroughly and sift two or three times through a fine sieve, when the preparation will be ready for use—to be applied to use in packages or shells, or loose, in the same manner as common black blasting-powder is used, and ignited by means of a fuse; or it may be ignited by so arranging a vial of sulphuric acid that when inverted the contents will come in contact with the powder at the instant the explosion is desired.

I am aware that the several ingredients named by me have been employed, in addition to other ingredients, in various blasting-powders, and such I do not claim as my invention; but What I do claim as my invention, and desire to secure by Letters Patent, is—

An explosive compound consisting of chlorate of potash, sugar, and charcoal, in the proportion substantially as described.

TRUE P. SLEEPER.

Witnesses:
 ISRAEL R. PATTERSON,
 ELIJAH SPANGLER.